July 27, 1926.

T. CARROLL

CASH REGISTER

Filed May 21, 1921

Inventor
THOMAS CARROLL
BY Carl Brevot
Henry E Stauffer
Attorneys.

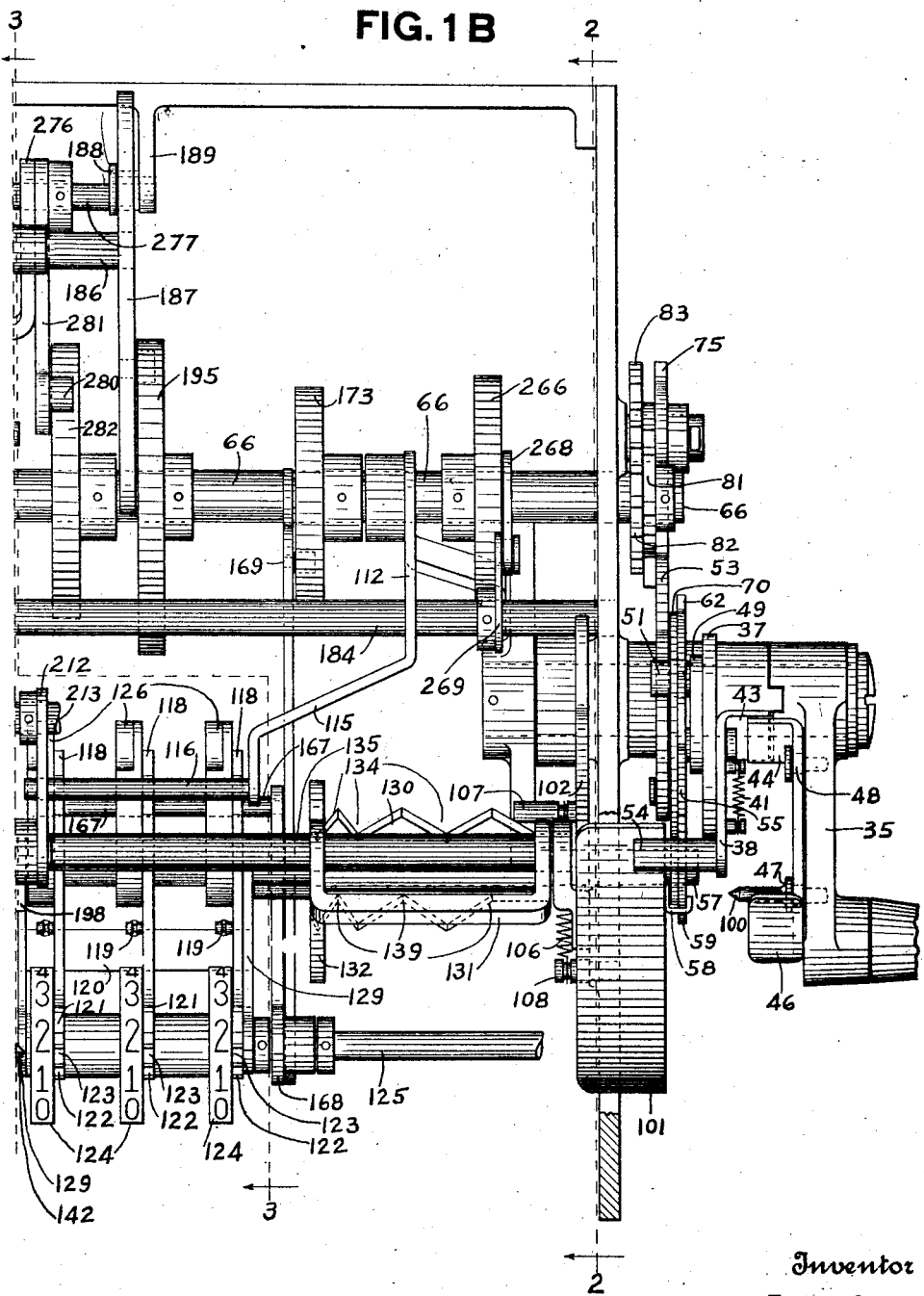

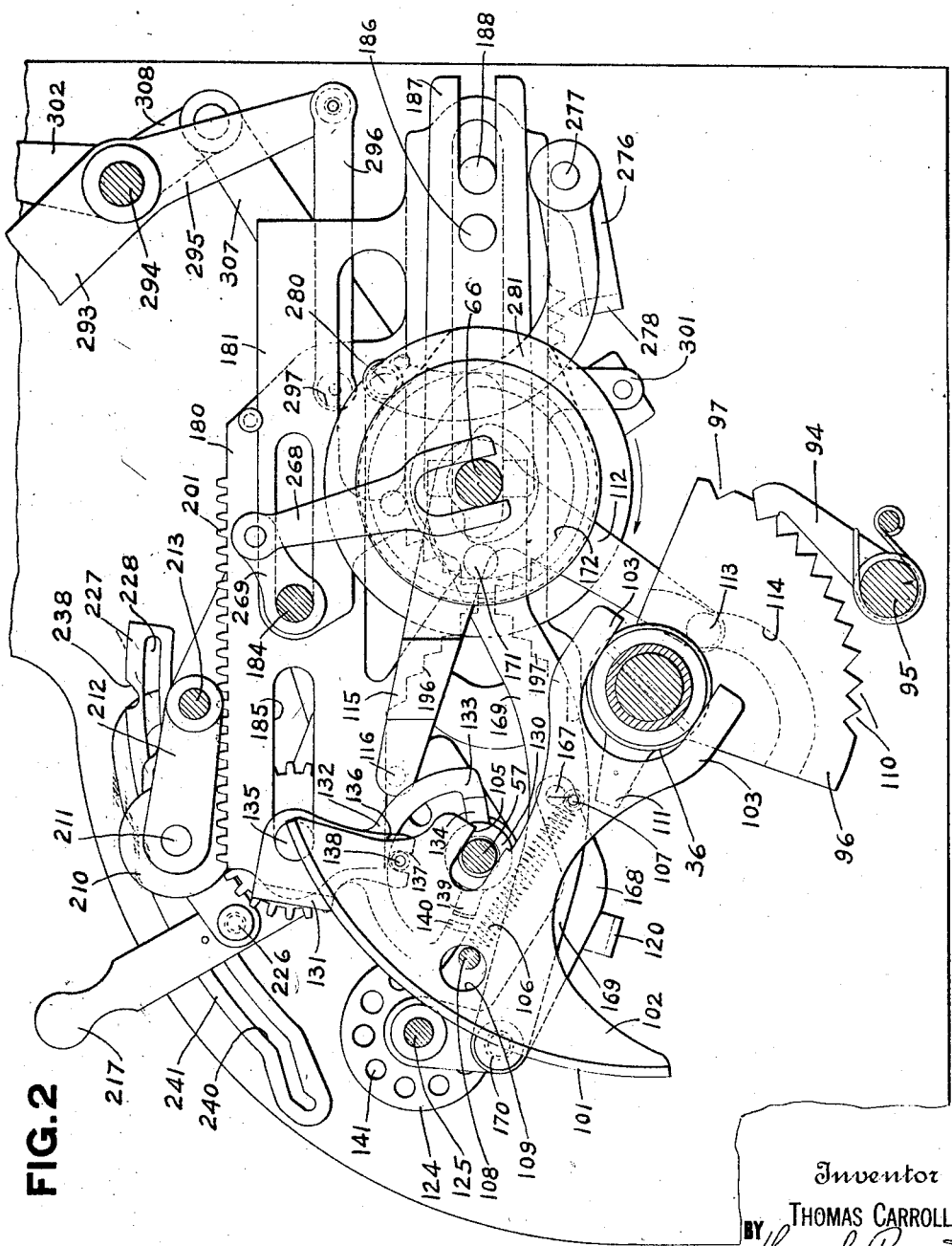

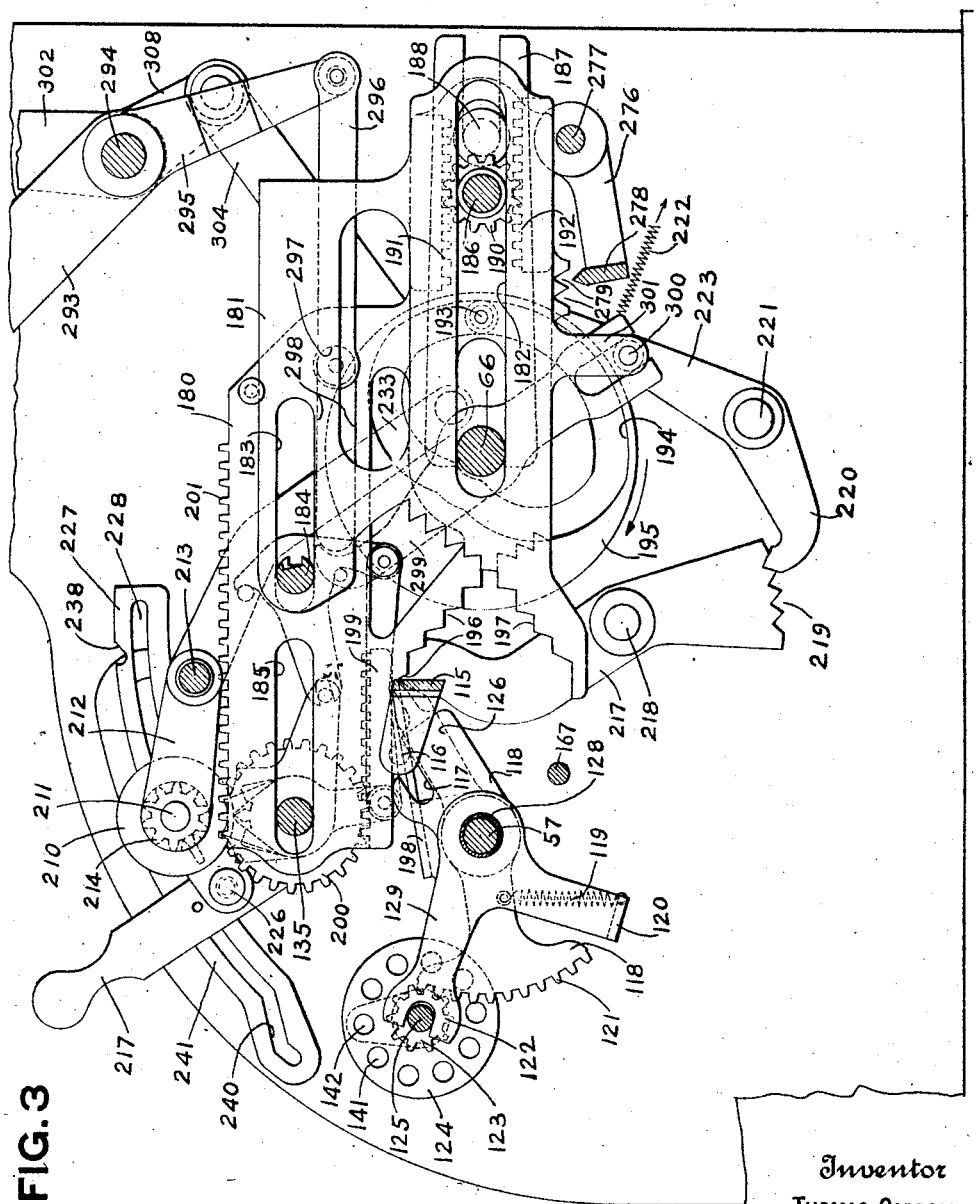

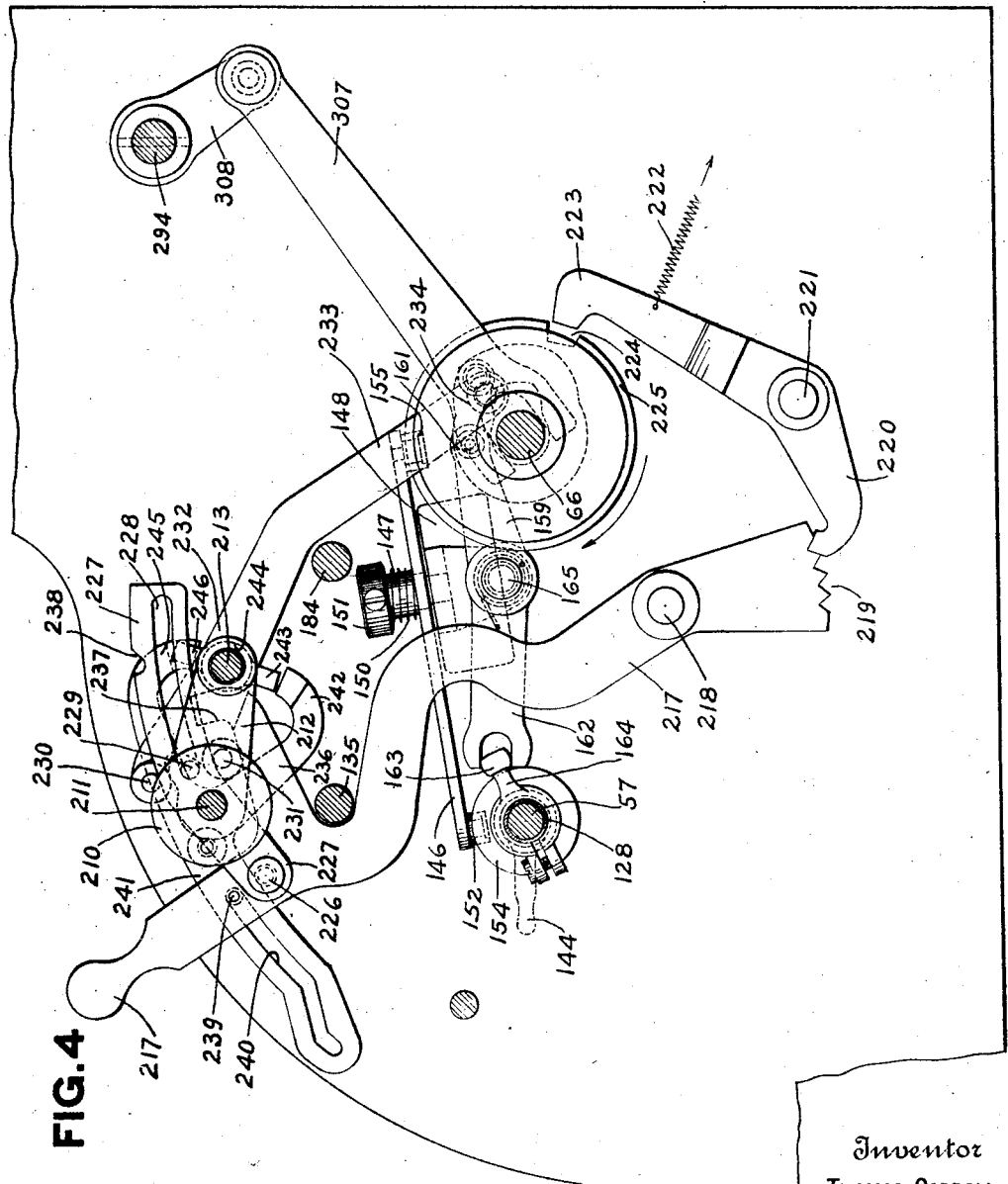

July 27, 1926.
T. CARROLL
CASH REGISTER
Filed May 21, 1921     10 Sheets-Sheet 6
1,593,569
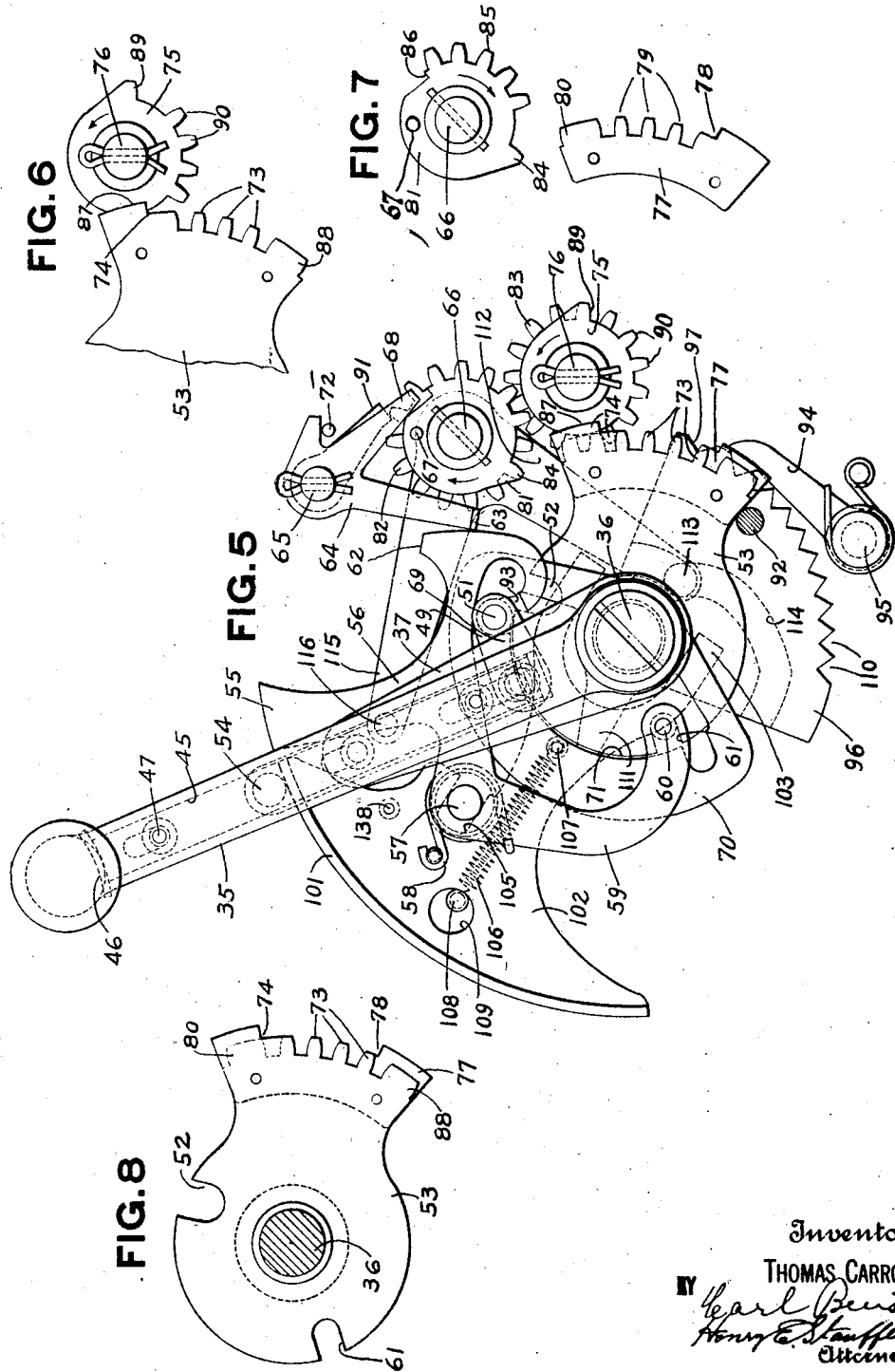
Inventor
THOMAS CARROLL

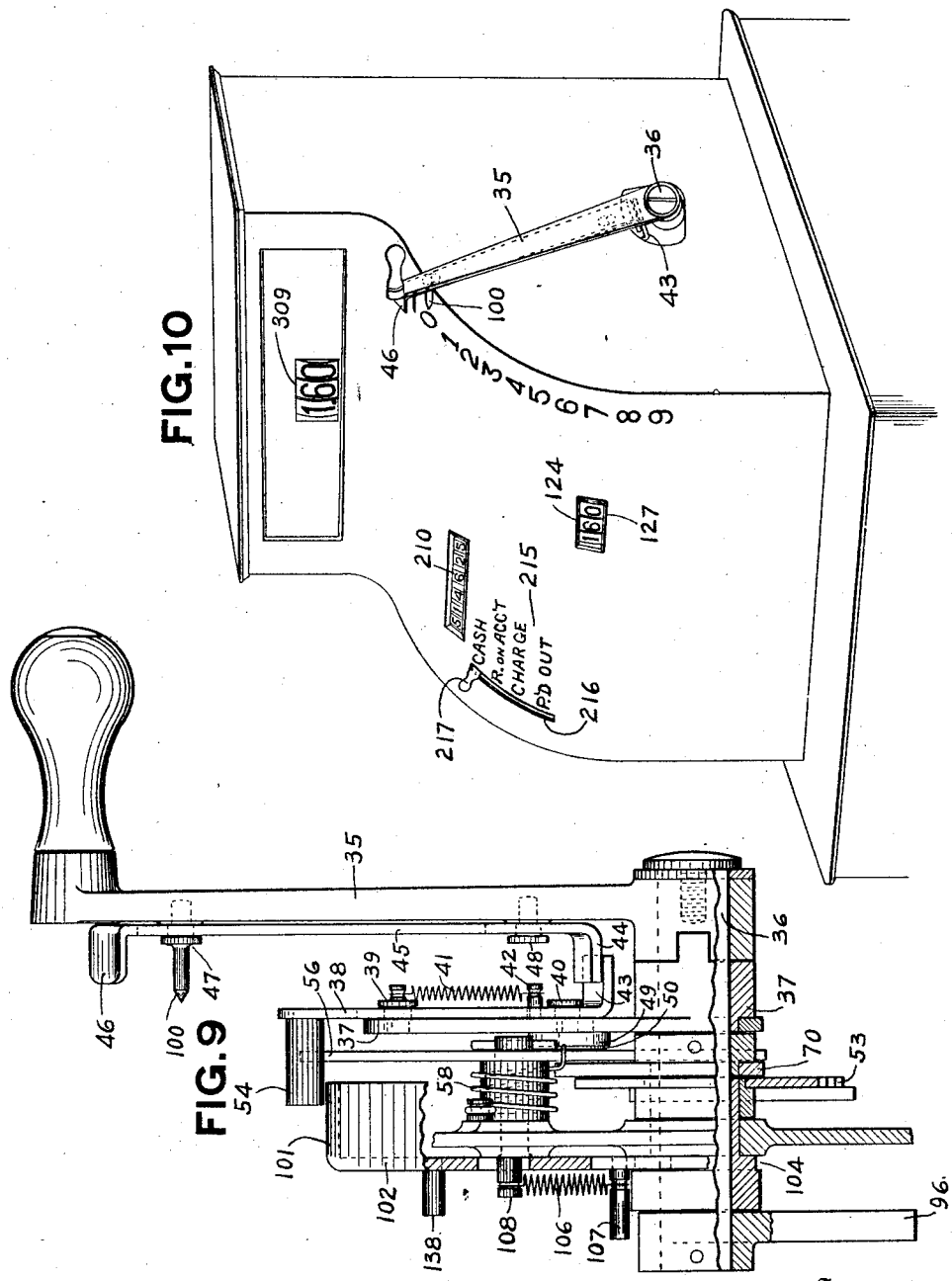

July 27, 1926.

T. CARROLL

CASH REGISTER

Filed May 21, 1921

Inventor
Thomas Carroll
BY
Attorneys

July 27, 1926.  
T. CARROLL  
1,593,569  
CASH REGISTER  
Filed May 21, 1921   10 Sheets-Sheet 9
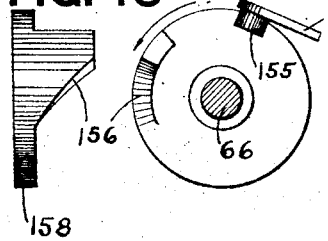
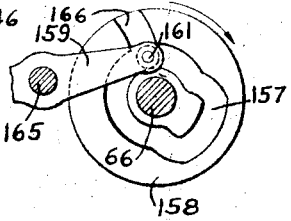
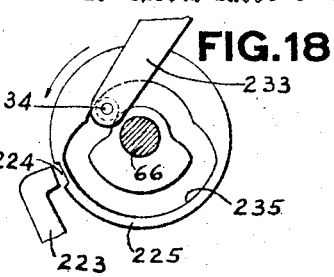
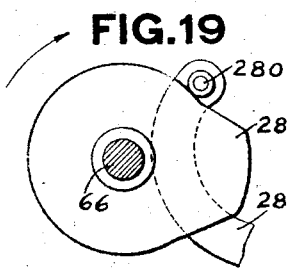
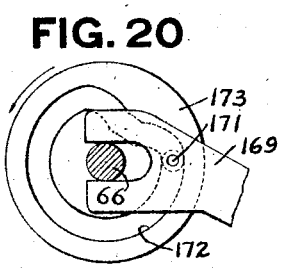
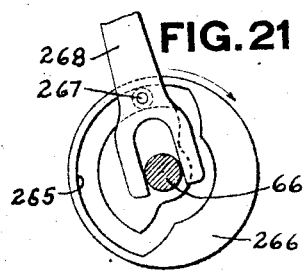
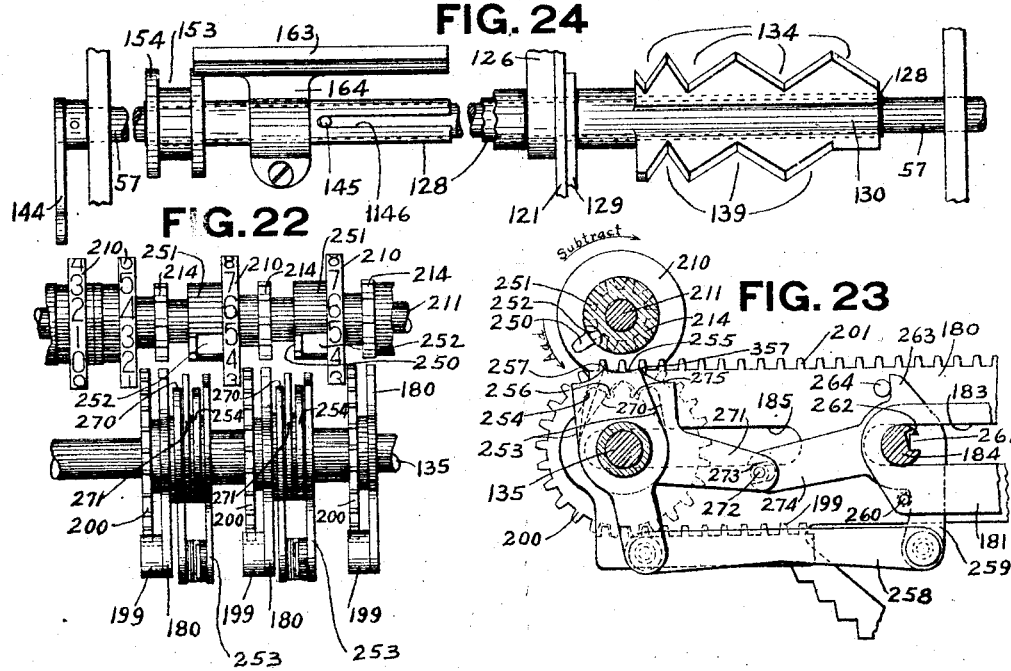
Inventor  
THOMAS CARROLL  
BY  
Attorneys July 27, 1926.
T. CARROLL
1,593,569
CASH REGISTER
Filed May 21, 1921
10 Sheets-Sheet 10
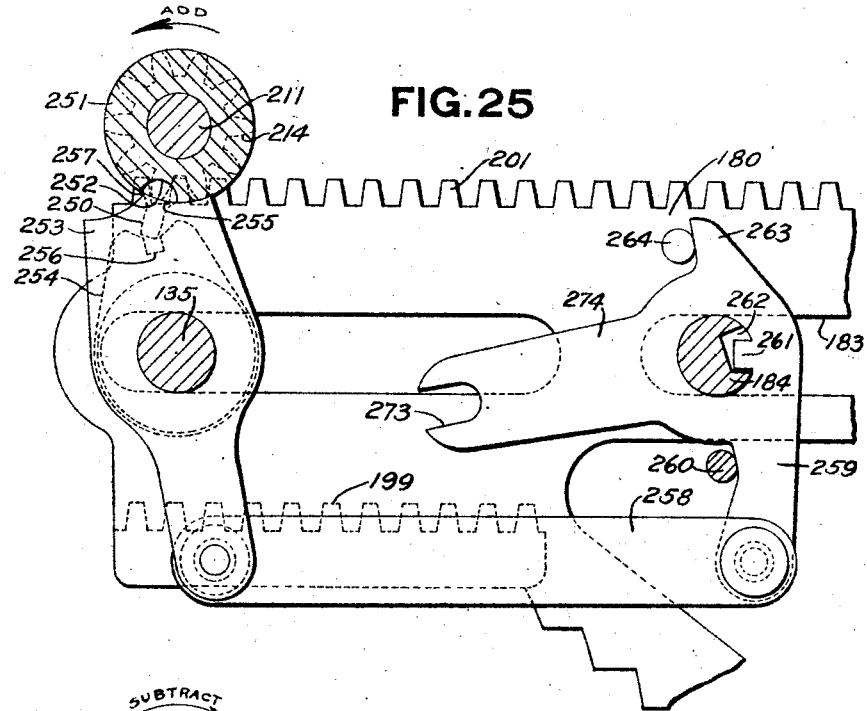
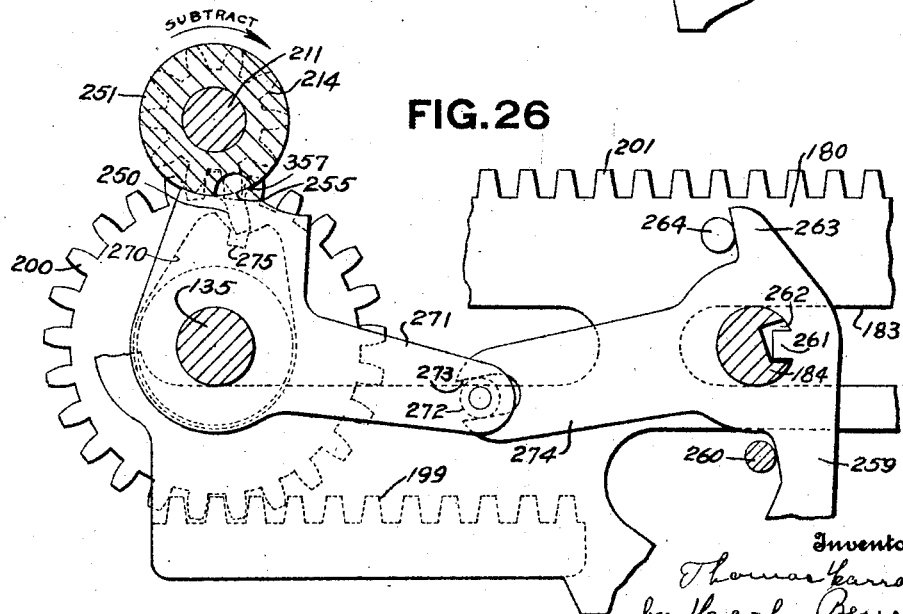

Patented July 27, 1926.

1,593,569

UNITED STATES PATENT OFFICE.

THOMAS CARROLL, OF DAYTON, OHIO, ASSIGNOR, BY MESNE ASSIGNMENTS, TO THE NATIONAL CASH REGISTER COMPANY, OF DAYTON, OHIO, A CORPORATION OF MARYLAND.

CASH REGISTER.

Application filed May 21, 1921. Serial No. 471,483.

This invention relates to accounting machines, and particularly to that class known as cash registers.

It is an object of this invention to provide mechanism permitting items of one or more denominations to be set up and then entered in a totalizer and displayed by an indicator, by means of a single lever.

Another object of this invention is the provision of means for controlling the entry of items in the totalizer in an additive or subtractive sense in accordance with the nature of the transaction, means being also provided to permit the totalizer to remain in idle position during an operation of the machine.

With these and incidental objects in view the invention consists in certain novel features of construction and combination of parts, the essential elements of which are set forth in the appended claims and a preferred form of embodiment of which is hereinafter specifically described with reference to the drawings which accompany and form part of this specification.

Of said drawings:—

Figs. 1ᴬ and 1ᴮ taken together constitute a top plan view of the machine with the cabinet and certain parts omitted for the sake of clearness.

Fig. 2 is a transverse section of the machine taken on the line 2—2 of Fig. 1ᴮ.

Fig. 3 is a transverse section of the machine taken on the line 3—3 of Figure 1ᴮ.

Fig. 4 is a transverse section of the machine taken on the line 4—4 of Fig. 1ᴬ.

Fig. 5 is a side elevation of the lever mechanism.

Fig. 6 is a detail view of one of the driving segments and the intermediate mutilated gear.

Fig. 7 is a detail view of one of the driving segments and the mutilated gear on the main driving shaft.

Fig. 8 is a detail view of the driving segment.

Fig. 9 is a front elevation, shown partly in section, of the lever mechanism.

Fig. 10 is an exterior perspective view of the machine.

Fig. 15 is a detail front elevation of the escapement return cam.

Fig. 16 is a detail side elevation of the escapement return cam.

Fig. 17 is a detail view of the escapement rocking cam.

Fig. 18 is a detail view of the counter engaging cam.

Fig. 19 is a detail view of the actuating racks alining cam.

Fig. 20 is a detail view of the actuating stop return cam.

Fig. 21 is a detail view of the totalizer transfer mechanism restoring cam.

Fig. 22 is a detail front elevation of part of the totalizer mechanism.

Fig. 23 is a detail side elevation of part of the totalizer adding and subtracting mechanism.

Fig. 24 is a detail view of part of the escapement mechanism.

Fig. 25 is an enlarged detail view of the adding transfer mechanism.

Fig. 26 is an enlarged detail view of the subtracting transfer mechanism.

Figure 1A:
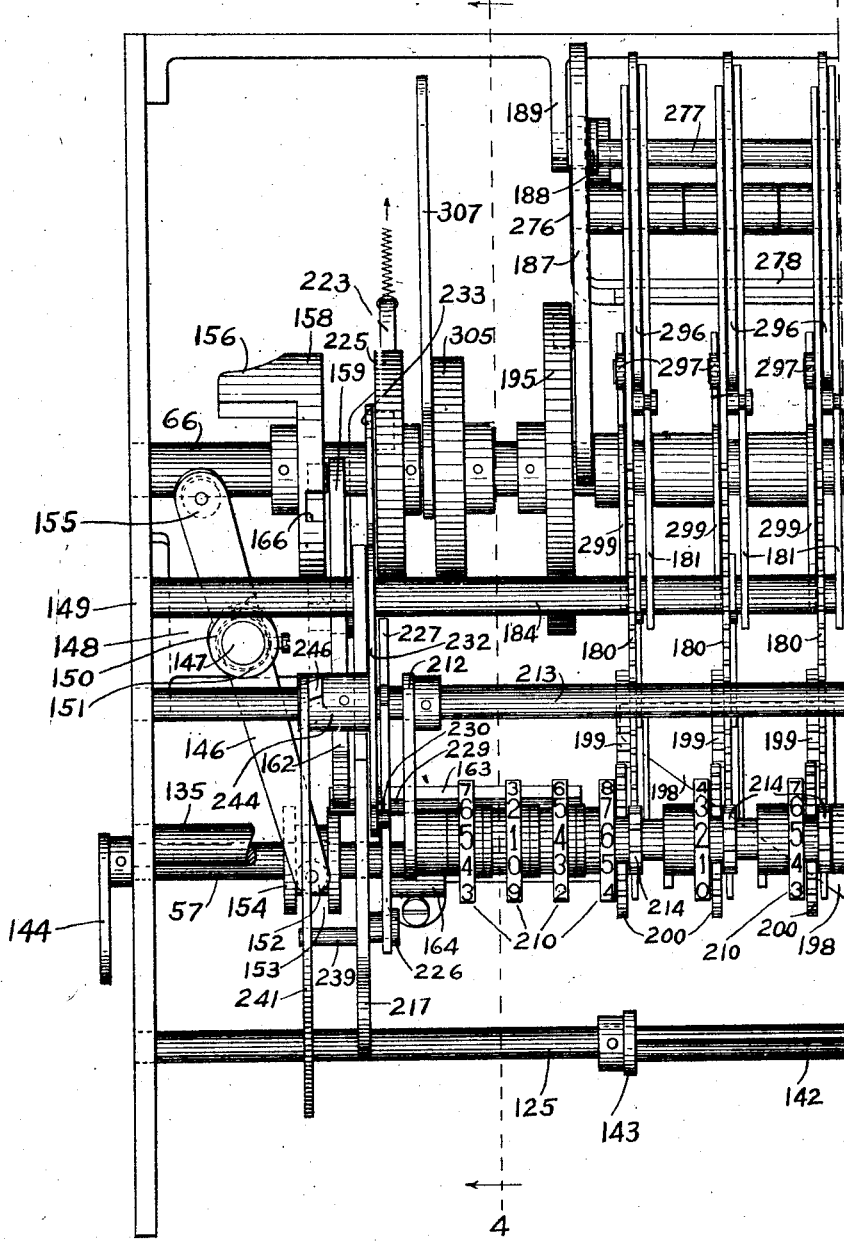

The machine disclosed comprises an operating lever located at the right hand end of the machine and normally operatively connected to index indicators and adjustable stops to adjust the same in accordance with the digit representing the position of the operating lever. The lever carries a thumb-piece which is operated to move the index indicators and adjustable stops to the left to disconnect the left hand indicator and stop from the operating lever and to lock the same in adjusted position in the units column. This operation may be repeated to set up items of three denominations.

The machine also comprises means under control of the thumb-piece for operatively connecting the operating lever to totalizer actuators to actuate a display indicator and totalizer in accordance with the amount set up, as indicated by the index indicators.

A manipulative means located at the left hand end of the machine is positioned in accordance with the nature of the transaction. In the cash and received on account positions, it positions the totalizer to be actuated in an additive sense; in the paid out position it positions the totalizer to be actuated in a subtractive sense; and in the charge position it renders the means for moving the totalizer into engagement with the totalizer actuators ineffective.

Driving mechanism.

The machine in the drawings is constructed to be driven by means of an oper-   A plate 70, pinned to the shaft 36 and provided with a slot 93 into which the pin 51 extends, will move with the lever 35 to its operating position where it will be retained by a spring pressed pawl 94 pivoted upon the stud 95 mounted in the side frame of the machine. The end of this pawl engages with notches in a ratchet segment 96 which is pinned to the shaft 36, and when the lever is placed in its operating position pinion 82 (Fig. 5) fast on the shaft 66 meshes with a pinion 83 free on the stud 76 and fast to the mutilated pinion 75. When the segment 53 is rocked counter-clockwise (Fig. 5) by the operation of the lever 35 the shoulder 80 (Fig. 7) on the segment 77 first engages the tooth 84 on the pinion 81, thereby turning the latter clockwise to mesh its teeth 85 with the teeth 79 on the segment 77. Near the end of this counter-clockwise movement of the segment 53, and as the teeth 85 pass out of engagement with the teeth 79, the shoulder 78 cooperates with the notch 86 in the pinion 81 to complete the first one-half rotation of the pinion. During this one-half movement of the pinion 81 the shaft 66 (Figs. 5 and 7) is given one-half of a rotation in the direction of the arrow. During the initial counter-clockwise movement (Fig. 5) of the segment 53 a shoulder 74 on the segment passes out of engagement with a notch 87 in the pinion 75 to permit rotation of the shaft 66, the pinions 82 and 83 being always in mesh. At the beginning of the clockwise movement (Fig. 5) of the segment 53 to normal position, the shoulder 78 (Fig. 7) first moves out of engagement with the notch 86 and then an edge 88 (Fig. 6) on the segment 53 engages a tooth 89 on the pinion 75, thereby rotating the pinion 75 to move its teeth 90 into mesh with the teeth 73. As the teeth 90 pass out of engagement with teeth 73, shoulder 74 engages in the notch 87, thereby completing the second one-half rotation of the pinion 75 and the shaft 66. It can be seen from the above description that when the lever 35 is rocked counter-clockwise (Fig. 5) the segment 77 cooperates with the pinion 81 to give the shaft 66 one-half of a rotation in the direction of the arrow shown in Figs. 5 and 7. Then during the return movement of the lever 35 to normal position, the edge 88, teeth 73 and shoulder 74 by which segment 53 cooperates with the pinion 75, impart a second one-half rotation to the shaft in the direction of the arrow, the shaft being given one complete rotation in this manner.

A retaining pawl 91 (Fig. 5), pivoted on the stud 65, engages the teeth of the pinion 82 and serves to prevent backward rotation of the shaft 66 and hence compels complete operation of the lever after its operation is once started. A pin 92 (Fig. 5), projecting from the side frame of the machine, forms a stop for the segment 53 when it is rocked in a clockwise direction. A similar stop is provided for the segment when it is rocked in a counter-clockwise direction, but is not shown in the drawings.

*Item index mechanism.*

The machine has a lever index on the front of the cabinet or cover for the "operating" position and ten positions for the digits "0" to "9" inclusive, and the order in which the index is arranged is shown in Fig. 10. The lever 35 swinging on its pivot 36 is moved forward or backward, and, guided by a pointer 100, is stopped opposite the digit to be recorded. After the lever is brought to a stop the operator presses his thumb on the formed member 46 and by a slight downward motion the ear or projection 44 at the lower end of plate 45 (Fig. 9) will contact a similar projection 43 formed on the lower end of the plate 38 and cause this plate to move in unison with the plate 45. The pin 54 (Figs. 1B, 5 and 9) projecting from the plate 38 and extending over a flange 101 formed on a bifurcated member 102, will cause said member to move toward the shaft 36 whenever the thumb presses the plate 45 downward during an indexing operation. The bifurcated end 103 of the member 102 slides in a groove 104 (Fig. 9) which guides the lower end of this member. The upper end is guided by the shaft 57 which cooperates with a slot 105 in said member (Fig. 5). This member is normally held in its outward position by a spring 106, one end of which is attached to a pin 107 projecting therefrom, the other end being attached to a stop pin 108 projecting from the side frame of the machine and extending through an opening 109 in the member 102.

The ratchet plate 96, which is pinned to the shaft 36 (Figs. 1B, 2, 5 and 9), is rocked with the indexing movements of the lever 35 by means of mechanism hereinbefore set forth, and the notches 110 together with the pawl 94 form a retaining means for the indexing lever, there being a notch for each digit of the index. The upper notch 97 in which the pawl 94 engages when the lever 35 is placed in the "operating" position will retain the plate 70 while the lever 35 is rocked to operate the machine. In this position of the plate 70 a projection 111 extending forwardly and upwardly from the ratchet plate 96 will be in a position to cooperate with the pin 107 to prevent any movement of the plate 102 during the operation of the machine.

Freely mounted upon the shaft 66 is a bell crank lever 112 (Figs. 1B, 2 and 5) carrying in its lower end an anti-friction roller 113 which travels in a groove 114 formed in the left hand side of the ratchet plate 96. As the lever 35 is moved forward and rearward during the indexing of items the bell crank lever 112 will be caused to rock differentially on its pivot 66 by the cooperative action of the roller 113 and groove 114. The upwardly and forwardly extending arm 115 of the bell crank lever 112 carries near its end a laterally projecting arm 116 which engages with a slot 117 formed in a segment lever 118 (Fig. 3). This segment lever 118 is freely mounted upon the shaft 57 and is normally held in contact with the arm 116 by a spring 119, one end of which is attached to the segment lever, the other end being attached to a frame member 120. The swinging of the bell crank lever 112 on its pivot 66 will cause the segment lever 118 to swing on its pivot 57, and as the forward edge of this segment lever has several teeth 121 which engage with teeth 122 of a pinion 123, fast to an index indicator wheel 124, the swinging of the segment lever will cause the index indicator to rotate on its shaft 125.

From the foregoing description it will be seen that as the single lever 35 is moved forward and rearward in indexing items, it will rotate the index indicator 124. Fig. 1$^B$ shows three index indicators, there being one for each pair of differentially and complementarily movable members.

Each segment lever 118 has fast to it, and swinging on the pivot 57, an adjustable stop arm 126 which cooperates with the differentially and complementarily movable members which will be hereinafter described.

The index indicators 124 and the adjustable stop arms 126 are moved longitudinally to the left, step by step, on their respective shafts 125 and 57, when indexing the items. This movement is for the purpose of placing the adjustable stop arms 126 in cooperating position with the complementarily movable members, and also the index indicators 124 before the opening 127 (Fig. 10) in the cabinet so that the digits on these wheels may be displayed to the operator as an indication of the items about to be recorded. The frame member 120 (Figs. 1$^B$ and 3) which embraces the index indicators 124 and the adjustable stop arms 126 will cause these parts to slide as a unit on their respective shafts. Referring to Fig. 3 it will be seen that the frame 120 is freely mounted upon a telescopic sleeve 128, and has two bifurcated arms 129 extending forward to engage with the shaft 125, at each end of the group of index indicators.

This frame 120 is given a step by step movement to the left (Fig. 1$^B$) by an escapement device which consists of a notched sleeve 130 fast on the telescopic sleeve 128, and a yoke 131 freely mounted upon a shaft 135 having the left hand end 132 (Fig. 2) bifurcated, and with angle edges 133 and 140 to engage with the angle notches 134 and 139 in the notched sleeve 130. The distance between the angles edges 133 and 140 is less than the distance between the high points of the projections on the notched sleeve 130, so that with the sleeve in the position shown in Fig. 2, one or the other of the angle edges is always in position to prevent the sleeve from returning to its home position. The right hand end of the yoke 131 (Fig. 2) has a downwardly extending arm 136 slotted as at 137 to engage with a pin 138. This pin projects laterally from the member 102 (Figs. 2 and 9), and as this member 102 is moved when indexing the pin 138 will rock the yoke 131 on its pivot 135 in a counterclockwise direction, causing the angle edge 133 to leave the notch 134, and simultaneously the angle edge 140 will enter a notch 139, moving the notched sleeve 130 one-half space to the left. On the return movement of the member 102 by the action of the spring 106 the yoke 131 will be rocked in a clockwise direction, disengaging the angle edge 140 from the notch 139 and engaging the angle edge 133 with the second notch 134 (Fig. 1$^B$), moving the notched sleeve 130 a second one-half space. This escapement action has placed the left hand index indicator into a reading position through the opening in the cabinet, as shown in Fig. 10. At the same time the left hand adjustable stop arm 126 will have been moved into cooperating position with the first or right hand group of differentially and complementarily movable members 180 and 181.

Each index indicator 124 (Figs. 1$^B$ and 3) has a group of holes 141, there being one for each of the digits shown in the periphery of the indicator. As the first escapement occurs and the left hand index indicator moves to the left a pin 142 will enter one of the holes 141 and retain this indicator from further rotation until it again assumes its normal position. The pin 142 (Fig. 1$^A$) projects laterally from an arm 143 pinned to the shaft 125 and is parallel with said shaft. As the indicator engages with the pin 142 the segment lever 118 simultaneously disengages from the arm 116 (Fig. 1$^B$).

As the single lever 35 is moved to the second index position the middle and right hand indicators 124 (Fig. 1$^B$) will be rotated by the bell crank lever 115. The thumb of the operator presses on the projection 46 to make the second escapement, which is effected by rocking the yoke 131, thereby engaging and disengaging the angle edges 133 and 140 with the second pair of notches in the sleeve 130. This second escapement is greater than the first in order to bring the left hand adjustable stop arm 126 in alinement with the second or center group of differentially and complementarily movable members and the center or second adjustable stop arm 126 into alinement with the right hand group of differentially and complementarily movable members. The index indicators will move another space to the left, the pin 142 entering a hole in the center or second indicator and the center segment lever 118 moving out of engagement with the pin 116.

Moving the single lever 35 to the next or third position and pressing on the projection 46 as before, the yoke 130 will be rocked, causing the notched sleeve to move toward the left as before, shifting the adjustable stop arms 126 another space, which will aline the left hand stop arm with the third or left hand group of differentially and complementarily movable members, the center arm 126 will aline with the center or second group of differentially and complementarily movable members and the right hand arm 126 will be placed into alinement with the right hand or first group of movable members. The index indicators will be shifted another space toward the left, which will cause the pin 142 to enter a hole in the third indicator 124 and retain it in its indexed position, together with the other two indicators. One digit on each of the three index indicators is now displayed through the opening 127 (Fig. 10) in the cabinet. These digits represent the items indexed by the single lever 35.

Should there be an error in indexing the items it can be corrected before the machine is operated by rocking a lever 144 (Figs. 1ᴬ, 4 and 24) in a clockwise direction. This lever is pinned to the shaft 57 on the left hand end, and outside the cabinet of the machine. A slight rocking motion of the shaft 57 (Fig. 24) will, by means of a pin 145 projecting from the shaft 57 into a slot 1146 in the telescopic sleeve 128, cause the notched sleeve 130 to assume a position wherein the notches 134 and 139 will be out of the plane of the angle edges 133 and 140 (Fig. 2), and permit a lever 146 (Figs. 1ᴬ and 4) under tension of spring 150 to slide the sleeve 128 on the shaft 57 toward the right to restore the mechanism controlled by the escapement device to its normal position.

This lever 146 pivots on a stud 147 mounted in a bracket 148 fast to the inside of the left hand machine frame 149. A spring 150 attached to a collar 151 and the lever 146 will cause the lever 146 to swing on its pivot in a counter-clockwise direction whenever the shaft 57 is rocked. Mounted near the forward end of the lever 146 is an antifriction roller 152 which engages with a groove 153 in a collar 154 fast on the left hand end of the telescopic sleeve 128 (Figs. 1ᴬ, 4 and 24).

At a time near the end of each operation of the machine the shaft 57 is mechanically rocked to permit the return of the mechanism controlled by the escapement device to its normal position.

During the indexing by the single lever 35, the lever 146 (Fig. 1ᴬ) swings on its pivot in a clockwise direction, assuming a position in which an anti-friction roller 155 carried thereby will be engaged by a crown cam 156 (Figs. 1ᴬ, 4 and 15) at the proper time and the lever returned to its normal position. This positive acting means for returning the lever is to insure the return of the notched sleeve 130 to home position at the proper time during each operation of the machine.

A cam groove 157 is formed in the side of the disk 158 (Fig. 17) and timed so as to rock the sleeve 128 just before the crown cam 156 acts upon the lever 146. A lever 159 pivoted upon a stud 165 (Figs. 1ᴬ, 4 and 17) carries an antifriction roller 161 adapted to cooperate with the groove 157 to rock the lever 159 in a counter-clockwise direction. The forward end 162 of the lever 159 is bifurcated to engage a horizontal bar 163 supported by an arm 164 clamped to the sleeve 128. A groove 166 (Fig. 17) extending from the cam groove 157 to the periphery of the disk 158 will permit the lever 159 to rock on its pivot as the shaft 57 (Fig. 24) is rocked by the lever 144 when an error in the indexing is being corrected.

After the mechanism controlled by the escapement device is returned laterally to its normal position, a pin 167, projecting from an arm 168 (Figs. 1ᴮ, 2 and 3) and extending under the group of adjustable stop arms 126, will be elevated at the proper time to engage with the segment levers 118 and swing them on their pivot 57 in a counterclockwise direction, bringing the index indicators 124 to their "zero" or normal position and at the same time returning the adjustable stop arms 126 to their zero or normal position, as shown in Fig. 3.

The arm 168 is freely mounted upon the shaft 125, and is swung on its pivot by a pitman 169, which is pivoted at its forward end upon a stud 170 mounted in the arm 168. The rear end of the pitman is bifurcated so as to be guided by the shaft 66 during the reciprocating motion given to the pitman by a cam roller 171 cooperating with a cam groove 172 formed in the side of a disk 173, which is mounted upon and fast to the main driving shaft 66.

The cam groove 172 (Fig. 20) is of such form as to place the pin 167 (Figs. 2 and 3) in its lower position near the end of the operation of the machine so as to permit free movement of the adjustable stop arms 126 at the next indexing operation of the lever 35. The adjustable stop arms are retained in their normal position by the aid of the springs 119 until moved by the single lever 35.

*Differential mechanism.*

Figure 13:
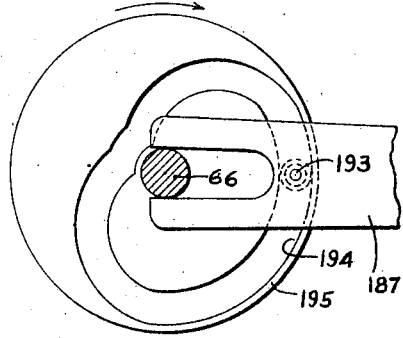
Fig. 13 is a detail view of the totalizer actuating cam.

As previously intimated, the differential mechanism comprises a plurality of pairs of members. Each of these pairs comprises a rack bearing member 180 and a companion member 181 (Figs. 1ᴬ, 2, 3 and 23). The members of each pair are close together and have slots 182 and 183 through which the driving shaft 66 and a rock shaft 184 extend. The member 180 has an additional slot 185 through which the shaft 135 extends. Extending through the slots 182 is a rod 186 supported at its ends in plates 187 (Figs. 1A, 1B, 2 and 3). Both of these plates are slotted at their rear ends to engage studs 188 fastened to extensions 189 on the rear machine frame and at their forward ends the plates are slotted to engage the driving shaft 66. Mounted on the rod 186 is a pinion 190 (Fig. 3) for each pair of members, these pinions meshing with racks 191 and 192 fastened respectively to the actuating members 180 and companion member 181. Each of the plates 187 carries a roller 193 (Figs. 3 and 13) projecting into a cam slot 194 in the side of a disk 195 fast to the main driving shaft 66. It will be recalled that at each operation of the machine the driving shaft makes one complete rotation and the cam grooves 194 are so shaped that at each rotation the plates move forward and then rearward an invariable extent. This movement of the plates 187, because of the engagement of the pinions 190 with the racks 192 on the complementarily movable members, will carry the members forward until they are arrested by the engagement of steps on their forward ends with the ends of the adjustable stop arms 126 (Fig. 3). As shown in Figs. 2 and 3 the steps 196 on the members 180 are arranged in a direction opposite to that of the steps 197 on the member 181.

Normally the member 180 is held in its zero position by an arm 198 (Figs. 1A, 1B and 3) extending laterally from the frame 120, and as the adjustable stop arms 126 are moved into alinement with the complementarily movable members 180 and 181 this arm 198 simultaneously moves out of engagement with these members. If the index position of the single lever 35 is at zero the adjustable stop arm 126 (Fig. 3) will engage with the top notch 196 on the member 180. In this position the members 180 will be held stationary while the companion member 181 will, when the rod 186 and pinions 190 are drawn forward, be given ten steps of movement. It will be recalled that placing the single lever 35 to the "1" position on the index, rocks the bell crank arm 115 one step, and this one step of movement will be imparted to the adjustable stop arm 126. This one step of movement will position the arm 126 to engage the first step 196 (Fig. 3) on the member 180, thereby limiting the member 180 to a single step of movement while the member 181 will move forward nine steps until its upper step engages the stop arm 126. If, on the other hand, the single lever 35 be placed in the "9" position on the index the adjustable stop arm 126 will swing downward to a point to clear the last step on the member 180 and in a position to engage with the lower step on member 181, in which position the member 181 will be permitted to travel forward one space and the member 180 will travel forward nine spaces. Movement of one of the members after the other has been stopped is, of course, due to the fact that during the rest of the forward movement of the rod 186 the pinion 190 will rotate about the rod and will also roll along the rack attached to the member held stationary.

The construction is such that when the rod 186 reaches the limit of its forward movement the elements 180 and 181 will, except in zero operations, both be held firmly in engagement with the adjustable stop arm 126. In zero operations, it will be recalled, the elements 180 are held stationary by the arm 198 while the elements 181 are given the full ten steps of movement. Fastened on the forward end of the complementarily movable members 180 are rack plates 199, which mesh with gears 200 freely mounted upon the shaft 135 (Figs. 3, 25 and 26). These gears actuate the totalizer when recording a subtracting transaction, which will hereinafter be described. The construction is such that movements of the members 180 are always positively controlled. This is a valuable feature of the construction, as the members 180 carry actuating racks 201 for operating the totalizer and the positive control of the members prevents any chance of wrong addition by making it impossible for the actuating members to be given a wrong extent of movement.

*Totalizing device.*

The totalizer shown in this machine is of a type similar to the totalizers shown in United States Letters Patent No. 1,265,301, granted to Thomas Carroll, May 7, 1918, and United States Letters Patent No. 1,302,509, granted to Thomas Carroll, May 6, 1919. As the general construction of this totalizer is not new only a brief description will be given. In the present invention the totalizer is both an adding and subtracting totalizer. The totalizer comprises a plurality of registering wheels 210 (Figs. 1A, 3, 22 and 23) loosely mounted on a shaft 211 supported at each end by arms 212 which are pinned to a shaft 213 journalled in the side frames of the machine. Fast to the three registering wheels 210 of lower order are pinions 214. These pinions mesh with the racks 201 when adding items in the totalizer, and when subtracting items from the totalizer the registering wheels are moved to the left a sufficient distance to bring the pinions 214 in the planes of the gears 200, with which they mesh at the proper time.

Referring to Fig. 10 it will be seen that the items may be divided into four different classifications, as shown by an index 215 near the left hand side of the machine. Just to the left of the index is a slot 216 in the cabinet through which a lever 217 extends, to be moved to the desired index position by the operator. This lever 217 is fulcrumed on a stud 218 which projects from the left side frame of the machine (Fig. 4). In the lower end of the lever 217 are four notches 219 corresponding to the four index places shown in Fig. 10 and previously referred to. Engaging with the notches 219 is a lever 220 freely mounted upon a stud 221 projecting from the side frame of the machine and normally held in engagement with the notch 219 by a spring 222. The upper end 223 of the lever 220 is formed to engage with a notch 224 in a disk 225 secured to the shaft 66, to lock the machine against operation while the index lever is being moved from one position to another. During an operation of the machine the end 223 contacts with the periphery of the disk thereby locking the index lever against manipulation.

Near the top of index lever 217 (Fig. 4) is a stud 226 upon which is pivoted a rearwardly and upwardly extending arm 227 having a slot 228 receiving a pin 229 projecting laterally from the left hand side of the totalizer arm 212 (Figs. 1A, 3 and 4). A pin 230 contacting with the upper edge of the arm 227 and a companion pin 231 contacting with the lower edge of said arm control the swinging of the arm on its pivot 226. These pins are mounted in a lever 232 which is pivoted on the shaft 213. The lower end 233 of the lever 232 has an anti-friction roller 234 engaging with a cam groove 235 formed in the disk 225 (Fig. 18). This cam rocks the lever 232 at the proper time to effect engagement and disengagement between the totalizer and the actuators.

The index lever 217 (Fig. 4) has a rearwardly extending arm 236 terminating in an upwardly extending projection 237, which contacts with the lower side of the shaft 211 when the index lever is in the "charge" position on the index. In this position of the lever the totalizer is locked in the normal position and will not engage with the actuators during the operation of the machine. The lever 232 will rock at every operation of the machine and when the index lever is in the "charge" position the arm 227 will have moved forward a distance sufficient to bring a slot 238 under the pin 230 into which this pin will rock so that the totalizer will not be rocked as in the other positions of the index lever.

As hereinbefore stated, items are subtracted from the totalizer as well as added. When the index lever 217 (Fig. 10) is moved to the last position on the index, which is "paid out," the items registered by the single lever 35 will be subtracted from the totalizer. The index lever 217 (Fig. 4) has a projecting pin 239 which engages with a slot 240 in the bifurcated member 241. This slot 240 is of such form as to rock the member 241 on its pivot 211 in a counter-clockwise direction when the index lever passes from the third to the fourth position on the index.

The lower arm 242 of the bifurcated member 241 is beveled on the end to engage with a companion bevel projection 243 extending downwardly from a sleeve 244 pinned to the shaft 213 (Figs. 1A and 4). As the bifurcated member 241 is rocked in a counter-clockwise direction the bevel edge on the arm 242 coming in contact with the bevel projection 243 (Fig. 4) will cause the shaft 213 (Fig. 1A) to move laterally a distance sufficient to place the totalizer pinions 214 in a plane with the actuating gears 200. During the operation of the machine the totalizer pinions 214 are lowered into mesh with the gears 200 (Figs. 3, 22, 23 and 26) and at the rotation of the gears the totalizer wheels are caused to rotate in a clockwise direction, which will subtract from the totalizer the items previously indexed by the single lever 35.

The return of the totalizer to the adding position is effected by moving the index lever 217 (Fig. 4) from the fourth position to the third position, which causes the bifurcated member 241 to rock on its pivot in a clockwise direction, bringing its upper arm 245 into contact with a beveled projection 246 extending upwardly from the sleeve 244. As the bevel on the upper projection 246 is inclined in the opposite direction from that on the lower projection 243 the shaft 213 will be returned to its normal position.

The mechanism for effecting transfers from lower to higher orders, both in adding and subtracting, will next be described. A transfer in an adding transaction is as follows: The units and tens of cents adding elements of the totalizer control respectively the actuating members 180 (Figs. 22, 23 and 25) of the tens of cents and units of dollars orders to cause the actuating members to have an added step of movement when transfers are to be turned in. The transfers to the fourth, fifth and sixth adding elements are effected directly by movement of the next lower order adding elements. The totalizer mechanism for controlling an actuating rack comprises a transfer tooth 250 (Figs. 22, 23 and 25), projecting from a hub 251, and a depression 252 in this hub. Each of the two lowest order adding wheels is provided with these elements. Cooperating with the depression 252 is a locking lever 253 pivoted upon the shaft 135. Attached to the locking lever 253 is a transfer plate 254 to be engaged by the long tooth 250. When the totalizer is rocked into engagement with the actuating racks the hub 251 will engage the curved portion 255 of the locking lever 253 and hold the locking lever and its transfer plate against displacement, but when the long tooth 250 is turned far enough to enter the transfer notch 256 in the transfer plate 254, the locking lever and transfer plate will be turned clockwise (Figs. 23 and 25), this movement being permitted by the depression 252 in the hub 251 which affords a clearance for the point 257 of the locking lever. The lower end of lever 253 is connected by a link 258 to a bell crank lever 259 mounted on the shaft 184. This bell crank lever controls the single step of relative movement of the members 180 and 181 to effect transfers. For this purpose when the locking lever 253 and transfer plate 254 have been turned by the transfer tooth 250 and locked in the new position by the periphery of the hub 251 a stud 260 projecting laterally from the member 181 will be intercepted by the bell crank lever 259 one step from the normal position of the member 181 so that the actuating member 180 will be caused to move a step farther rearward than in ordinary adding operations.

The transfer members are restored to normal near the end of the operation of the machine. The bell crank levers 259 are provided with lugs 261 engaging longitudinal grooves 262 in the shaft 184. These grooves are wide enough to permit movement of the transfer elements on the shaft when operated by the transfer teeth 250. After the operation of the members 180 and 181 the shaft 184 is rocked to engage the lugs 261 of the bell crank lever 259, which has been displaced, and rocks all of the transfer members back to original position and holds them there until the totalizer has been engaged with the operating racks. As the bell crank is rocked back to original position a projection 263 (Figs. 23 and 25) extending upward from the bell crank will engage a pin 264 projecting from the side of the actuating member 180 and restore the actuating member to adding relationship with the rest of the mechanism. If no transfers are to be turned in the projection 263 will stop the member 180 at the end of its normal adding stroke.

The shaft 184 is rocked at each operation by a cam groove 265 (Fig. 21) in the side of a disk 266 fastened to the driving shaft 66, cooperating with a roller 267 attached to the side of a pitman 268 pivoted at its upper end to an arm 269 fastened to the rock shaft 184 (Figs. 1B and 2).

For effecting a transfer in a subtracting operation, the registering wheels being rotated in the opposite direction to that in adding, a separate group of transfer elements is provided. The totalizer having been moved to the left by the index lever, the long tooth 250, hub 251, and depression 252 (Figs. 22 and 23), will be positioned to cooperate, respectively, with a transfer plate 270, a locking lever 271 and a point 257 on the locking lever. Projecting laterally from the lever 271 and near its rear end is a pin 272 which engages with a slot 273 formed in the end of the forwardly extending member 274 of the bell crank lever 259. As the registering wheel 210 rotates in a clockwise direction during a subtracting operation the long tooth 250 will engage with a notch 275 in the transfer plate 270 and cause the locking lever 271 to rock in a counter-clockwise direction, swinging the bell crank lever 259 on its pivot in the same direction as in an adding transfer, to effect the relative movement of the members 180 and 181, the same as in an adding transfer. The method of restoring a subtracting transfer is identical with that of the adding transfer hereinbefore described.

Transfers between the totalizer elements of higher order which are not operated by actuating members 180 are, as previously stated, effected directly by movement of the lower order elements. This higher order transfer is not shown and described, as it is fully illustrated and described in the Carroll patents hereinbefore mentioned.

The actuating members 180 and 181 are alined at the time of the completion of the movement of these members by an alining device comprising side arms 276 (Figs. 1A, 1B, 2 and 3) journalled on a rod 277, the side arms being connected by a cross plate 278 beveled at its upper edge to engage with notches 279 in the lower edges of the actuating members 180. As shown, there are two notches on each of these members, the rear notch being in position to cooperate with the alining plate 278 when no transfers have been turned in, the other, or forward notch, being in position to be engaged when the actuating member 180 has been given an additional step of movement rearward to turn in a transfer. In the normal position of the parts the plate 278 is out of engagement with the notches 279, and a roller 280 attached to the forward end of an arm 281 rigid with the right hand side arm 276 of the actuator alining frame engages a cam 282 which is so formed that at the proper time the arm 281 will be raised to bring the plate 278 into the notches 279.

Indicating mechanism.

Figure 11:
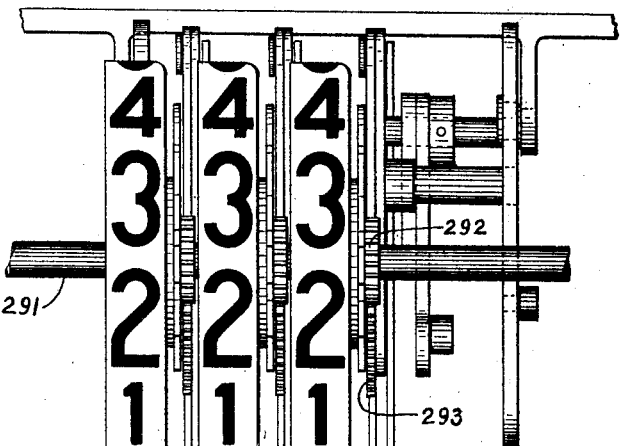
Fig. 11 is a detail plan view of the indicator mechanism.

The indicators 290 (Figs. 11 and 12) for indicating the various amounts registered, are rotatably mounted on a rod 291 extending laterally across the top of the machine. Fastened to each of the indicators is a pinion 292 meshing with a segment 293 loose on a rod 294. Rigid with each segment is an arm 295 to which is pivoted a link 296 (Figs. 1^A, 2 and 3) carrying a roller 297 engaging a slot 298 in the actuating member 180. Cooperating with the roller 297 is also a lever 299 pivoted on the shaft 66 and having a bifurcation at its lower end engaging a roller 300 carried by an extension 301 formed on the element 181. The arrangement is such that when the members 180 and 181 are moved forward the upper end of the lever 299 will be swung rearward, the upper end of the lever and the rear end of the slot 298 cooperating to move the roller 297 and link 296 directly from the position in which they were left by the last operation to a new position. At the end of the forward movement of the members 180 and 181 both the rear end of the slot 298 and the upper end of the lever 299 will be in engagement with the roller 297 so that the extent of the rotation of the indicator will be positively limited.

Figure 12:
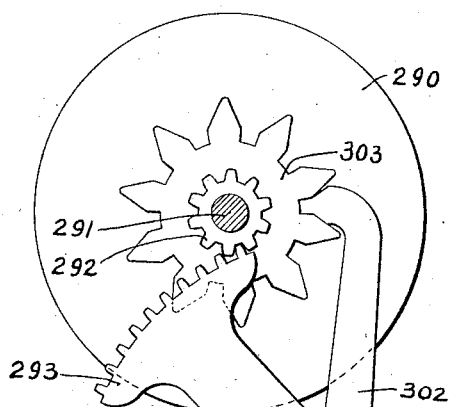
Fig. 12 is a detail side elevation of the indicator mechanism.
Figure 14:
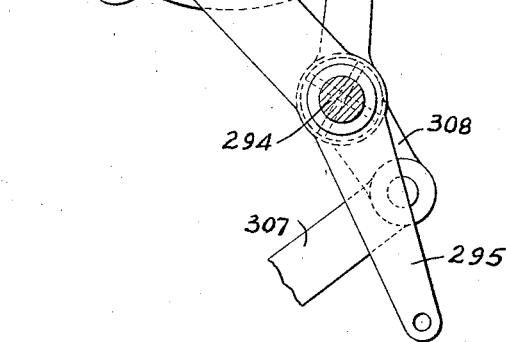
Fig. 14 is a detail view of the indicator alining cam.

The indicators are normally held stationary by locking arms 302 (Fig. 12) attached to the shaft 294 and engaging the teeth of alining wheels 303 rigid with the indicators. The shaft 294 is rocked by means of a cam groove 304 (Fig. 14) in the side of a disk 305 cooperating with roller 306 projecting from the side of a pitman 307 pivoted at its upper end to an arm 308 attached to the shaft 294 (Fig. 12). The cam groove 304 (Fig. 14) is so shaped that the indicator locking arms 302 are moved out of engagement with the alining wheels and held in this position until the elements 180 and 181 have all completed their forward movement. The locking arms are then returned to engagement so as to hold the indicators in the positions to which they have just been adjusted.

*Operation.*

In setting up an item the operating lever 35 is moved into a position corresponding to the item to be entered, if of one denomination, and to a position corresponding to the left hand numeral, if of more than one denomination. This rotates the index indicators 124 and positions the stop arms 126 correspondingly. By pressing down on the thumb piece 46 the left hand indicator and stop are moved to the left and are thereby disengaged from the operating lever and locked in adjusted position. This movement brings the left hand index indicator to view through the opening 127 and the left hand stop into a position to cooperate with the actuator for the units elements of the totalizer. If the item consists of several denominations the lever and thumb-piece are operated as before for the second and third numerals from the left. In each instance the adjusted stops and index indicators are shifted to the left.

After the item has been set up the operating lever is moved to its uppermost position. By pressing down on the thumb-piece the lever is operatively connected to the totalizer actuators 180 and 181 to actuate the same in accordance with the amount set up in the index indicators. The totalizer is then operated to engage with the racks to effect registration upon return movement of the racks.

At each operation of the machine the display indicators 290 at the top of the machine are moved to indicate the amount of the transaction.

The transaction index lever 217 at the left hand end of the machine controls the operation of the totalizer in accordance with the position it occupies when the machine is operated. In the cash and rec'd on acc't positions it positions the totalizer to be actuated in an additive sense by the rack 201; in the paid out position it positions the totalizer to be actuated in a subtractive sense by the rack 199; and in the charge position it permits the totalizer to remain idle during an operation of the machine by positioning the slot 238 in alinement with the actuating pin 230.

While the form of mechanism herein shown and described is admirably adapted to fulfill the objects primarily stated, it is to be understood that it is not intended to confine the invention to the one form of embodiment herein disclosed, for it is susceptible of embodiment in various forms all coming within the scope of the claims which follow.

What is claimed is:—

1. In a machine of the class described, the combination of an adjustable amount determining member, single differentially adjustable means for adjusting said member, means for holding said member in adjusted position, and means carried by said adjusting means for bringing said holding means and member into operative relation.

2. In a machine of the class described, the combination of adjustable amount determining devices, single differentially adjustable means for adjusting said devices, and means carried by said adjusting means for consecutively disconnecting said adjusting means from said devices.

3. In a machine of the class described, a differentially adjustable member, a differentially movable member controlled by said adjustable member, an operating means, and means for alternately connecting said operating means with said adjustable member and said differentially movable member.

4. In a machine of the class described, a differentially adjustable member, a differentially movable member controlled by said adjustable member, an operating means normally connected to said adjustable member, and means for disconnecting the operating means from the adjustable member and simultaneously connecting it with the differentially movable member.

5. In a machine of the class described, movable actuating members, adjustable amount determining means for controlling the movements of said members, means for operating said members and said means, and means carried by said operating means for alternately connecting and disconnecting said operating means from said members and said amount determining means.

6. In a machine of the class described, the combination of an adjustable amount determining means, mechanism for registering an amount represented by an adjusted position of said means, a movable member, and means adapted in certain positions of the movable member to be manipulated to effect a locking of the adjustable means, and in another position to operate means to connect the operating means to the registering mechanism.

7. In a machine of the class described, the combination of complementarily movable members, two sets of racks on one of said members, a gear driven from one of said racks, a totalizer, and means for moving the totalizer into operative association with the other rack and the gear dissimultaneously.

8. In a machine of the class described, in combination, a totalizer, an actuating member, two sets of racks on said actuating member, means for rocking the totalizer into position to be actuated from either rack, and means for rendering said rocking means ineffective and for predetermining from which rack the totalizer is actuated when the rocking means is effective.

9. In a machine of the class described, in combination, a totalizer, means for movably supporting said totalizer, means for rocking said totalizer, means for rendering said rocking means ineffective, and a single manipulative means for shifting said totalizer laterally differentially and rendering said rocking means effective.

10. In a machine of the class described, in combination, a totalizer involving gear wheels, a totalizer actuator comprising a rack adapted to mesh with one of said wheels, a second rack thereon, a gear meshing with said second rack and adapted to mesh with said wheel, said gear and first mentioned rack being out of alinement, and means for shifting said totalizer into operative association with said first mentioned rack and said gear.

11. In a machine of the class described, index indicators, manipulative means for setting said indicators, a fixed stop, and a second manipulative means for moving said indicators into engagement with the stop to be held in set position by said stop.

12. In a machine of the class described, a manipulative adjustable member for indexing and registering a plurality of items, an adjustable member adapted to be positioned by said manipulative adjustable member, an actuating member movable to extents determined by the adjusted position of said adjustable member, said last two mentioned members being normally out of alinement, and means for aligning said members.

13. In a machine of the class described, the combination of a totalizer actuator, a differentially adjustable stop member therefor normally out of alinement therewith, means for locking said stop member in adjusted position, and means for shifting said stop member laterally into alinement with said actuator and into operative relation with said locking means.

14. In a machine of the lever class, the combination of a single lever for indexing and registering a plurality of items, a plurality of pairs of movable members, and means controlled by the lever for giving said members differential relative movements combining to a constant value.

15. In a machine of the lever class, the combination of a single lever, a digit index for said lever, members adapted to be adjusted by said lever, a plurality of sets of complementary and differentially movable members cooperating with said members, and means actuated by the lever for moving said sets of members.

16. In a machine of the class described, the combination of a plurality of pairs of members adapted to be given differential relative movements, means for operating the members, a plurality of differentially adjustable stops for controlling the relative movements of the pairs of members, and a single lever for a plurality of digits controlling all of the stops and said operating means.

17. In a machine of the lever class, the combination of a single lever for a plurality of digits, a plurality of pairs of differentially and complementarily movable members, a differentially adjustable stop for each pair of members, and means controlled by the single lever for adjusting the stops.

18. In a machine of the lever class, the combination of a single lever for a plurality of digits, a plurality of pairs of differentially and complementarily movable members, a differentially adjustable stop for each pair of members, means controlled by the single lever for adjusting the stops to positions representing the indexed positions of the single lever, and means for consecutively locking said members in adjusted position.

19. In a machine of the lever class, the combination of an accounting device, item entering mechanism therefor comprising a plurality of pairs of differentially and complementarily movable members, and a single manipulative lever for differentially controlling said members to enter amounts of several denominations in the accounting device.

20. In a machine of the lever class, the combination of a totalizer, actuating mechanism therefor comprising a plurality of pairs of differentially movable members, a single lever for indexing a plurality of digits, and means adapted to be adjusted by the single lever for controlling the differential movement of the pairs of members.

21. In a machine of the lever class, the combination of a totalizer, actuating mechanism therefor comprising a plurality of pairs of members having differential movements combining to a constant value, and a single lever for a plurality of digits for controlling the differential movements of the members.

22. In a machine of the class described, the combination of a totalizer, totalizer actuating devices comprising a plurality of pairs of differentially and relatively movable members, means for imparting to the pairs of members differential relative movements combining to a constant value, a single lever for indexing a plurality of digits, and means controlled by the lever for controlling the relative movements of the members in the differential pairs in accordance with the digits indexed.

23. In a machine of the class described, the combination of a totalizer, totalizer actuating devices comprising a plurality of pairs of differentially and relatively movable members, one member of each pair being constructed to actuate the totalizer, means for imparting to the pairs of members differential relative movements combining to a constant value, a single lever common to all the pairs of members, and means controlled by said lever and in turn controlling the differential relative movements of all of the pairs of members.

24. In a machine of the class described, the combination of a totalizer, a plurality of pairs of differentially and relatively movable members, one member of each pair carrying a totalizer actuating rack, a single lever for a plurality of digits, differentially adjustable stops controlling the differential relative movements of the members, and means actuated by the lever for adjusting the stops.

25. In a machine of the class described, the combination of a totalizer, item entering mechanism therefor comprising a plurality of pairs of members having differential relative movements, one member of each pair carrying a totalizer operating rack, a single lever for a plurality of digits, a plurality of differentially adjustable stops controlling the differential relative movements of the members, and means controlled by the lever for differentially adjusting the stops.

26. In a lever machine, an indexing lever provided with a handle by which it may be adjusted differentially, a totalizer, adjustable totalizer actuators, lever actuated differentially adjustable stops controlling the adjustment of the actuators, digit carriers adjustable by means of the lever to set up items to be entered on the totalizer, means for clearing said digit carriers and returning said adjustable stops to zero position after said totalizer actuators have been differentially adjusted to positions representing the item to be entered.

27. In a machine of the class described, a laterally shiftable totalizer for adding and substracting items, an actuating means for adding items on said totalizer, actuating means for subtracting items from said totalizer, and a differentially movable manipulative means for moving said totalizer into operative association with either the adding actuating means or the subtracting actuating means.

28. In a machine of the class described, a laterally shiftable totalizer for adding and subtracting items, actuating means for adding items on said totalizer, actuating means for subtracting items from said totalizer, means for engaging said totalizer with either the adding or subtracting actuating means, and manipulative vertically movable lever means for preventing the engagement of the totalizer with either actuator.

29. In a machine of the class described, a totalizer for adding and subtracting items, an actuating rack for adding items on said totalizer, a coextensively and simultaneously movable second actuating rack, an actuating gear operated by said last mentioned actuating rack for subtracting items from said totalizer, and manipulative means for engaging said totalizer with either the adding rack or the actuating gear.

30. In a machine of the class described, a totalizer for adding and subtracting items, an actuating rack for adding items on said totalizer, an actuating rack for subtracting items from said totalizer, an actuating gear operated by said last mentioned actuating rack for subtracting items from said totalizer, and manipulative means for preventing the engagement of the totalizer with the actuating gear and adding rack.

31. In a machine of the class described, a laterally shiftable adding and subtracting totalizer, actuating means for said totalizer, means for engaging said totalizer with the actuating means, manipulative lever means for controlling said engaging means, and means for locking said manipulative means during the operation of said actuating means.

32. In a machine of the class described, a totalizer, a plurality of indicators for displaying items as they are entered on the totalizer, actuating means for said totalizer and indicators, a single lever for operating an indexing mechanism for a plurality of items, and manipulative means for disengaging the single lever from the indexing mechanism and engaging said lever with said totalizer and indicator actuating means.

33. In a mechanism of the class described, an item indexing mechanism, a main driving mechanism, a single indexing and operating lever, and means for retaining said driving mechanism in a position of rest when said lever is engaged with said indexing mechanism.

34. In a machine of the class described, an item indexing mechanism, a main driving mechanism, a single indexing and operating lever, and means for retaining said indexing mechanism in a position of rest when said lever is engaged with said driving mechanism.

35. In a machine of the class described, a totalizer adapted to be actuated in an additive and a subtractive sense, actuators therefor, adding transfer mechanisms, subtracting transfer mechanisms, said mechanisms being arranged in pairs and involving a common element and a pair of pivoted elements, and means controlled by said transfer mechanisms for permitting the actuators of higher order to be moved an added step.

36. In a machine of the class described, an adding and subtracting totalizer, an actuator, a rack thereon for actuating an element of the totalizer in an additive sense, a second rack thereon for actuating said element of the totalizer in a subtractive sense, a gear between said second rack and totalizer element, an adding transfer mechanism and a subtracting transfer mechanism for transferring amounts to said element, and means common to and controlled by said transfer mechanisms for permitting said actuator to be moved an added step to effect a transfer.

37. In a machine of the class described, the combination of adjustable stops, means for adjusting the stops, a lock for said stops, and means independently operated and carried by said adjusting means for consecutively moving said stops to place them under control of said lock.

38. In a machine of the class described, the combination of adjustable stops, a single means for adjusting the stops, a lock for said stops, and means carried by said adjusting means for consecutively moving said stops to place them under the control of said lock.

39. In a machine of the class described, the combination of adjustable stops, means for adjusting the stops, a lock for said stops, and means mounted on said adjusting means but independently operable for consecutively moving said stops to place them under the control of said lock.

40. In a machine of the class described, the combination of adjustable stops, a lock for said stops, an adjustable lever, and means actuated by said lever for adjusting said stops differentially.

41. In a machine of the class described, the combination of differentially adjustable stops, means for adjusting the stops, a lock for said stops, and means carried by said adjusting means for consecutively moving said stops to place them under the control of said lock.

42. In a machine of the class described, in combination, a totalizer, means for movably supporting said totalizer, means for rocking said totalizer, means for rendering said rocking means ineffective, and a manipulative means for shifting said totalizer laterally and rendering said rocking means effective.

In testimony whereof I affix my signature.

THOMAS CARROLL.